US008219523B2

(12) United States Patent
Ben Harush

(10) Patent No.: US 8,219,523 B2
(45) Date of Patent: Jul. 10, 2012

(54) DATA QUALITY ENRICHMENT INTEGRATION AND EVALUATION SYSTEM

(75) Inventor: Yossi Ben Harush, Naharia (IL)

(73) Assignee: SAP AG, Walldorf (DE)

( * ) Notice: Subject to any disclaimer, the term of this patent is extended or adjusted under 35 U.S.C. 154(b) by 1506 days.

(21) Appl. No.: 11/691,384

(22) Filed: Mar. 26, 2007

(65) Prior Publication Data

US 2008/0235288 A1 Sep. 25, 2008

Related U.S. Application Data

(60) Provisional application No. 60/896,868, filed on Mar. 23, 2007.

(51) Int. Cl.
*G06F 7/00* (2006.01)
*G06F 17/00* (2006.01)
(52) U.S. Cl. .......... 707/610; 707/758; 709/207
(58) Field of Classification Search .......... None
See application file for complete search history.

(56) References Cited

U.S. PATENT DOCUMENTS

| | | | | |
|---|---|---|---|---|
| 5,802,528 A * | 9/1998 | Oki et al. ................ | 1/1 |
| 5,819,268 A * | 10/1998 | Hackett ................ | 707/690 |
| 7,177,874 B2 * | 2/2007 | Jardin ................ | 707/714 |
| 7,289,974 B2 * | 10/2007 | Godeby et al. ................ | 707/736 |
| 7,788,278 B2 * | 8/2010 | Cheng et al. ................ | 707/769 |
| 2004/0083270 A1 * | 4/2004 | Heckerman et al. .......... | 709/207 |
| 2006/0100912 A1 * | 5/2006 | Kumar et al. .......... | 705/4 |
| 2007/0050340 A1 * | 3/2007 | von Kaenel et al. .......... | 707/3 |

* cited by examiner

*Primary Examiner* — Khanh Pham
*Assistant Examiner* — Azam Cheema
(74) *Attorney, Agent, or Firm* — Buckley, Maschoff & Talwalkar LLC

(57) ABSTRACT

Data quality enrichment integration and evaluation system that enables the import of data into a database and the turnkey integration with data enrichment entities. The data imported into the database may be validated using validation rules. Data with particular data quality problems may be sent to a particular bucket for to avoid processing or to obtain processing by a particular data quality enrichment entity. A bucket of data may be sent to be enriched by one or more data enrichment entities. The enrichment results may be compared between entities to enable the selection of a data enrichment entity. The enrichment results may also be drilled down into to provide geographic and other plots that show the quality of original data and quality of data enrichment provided by each data enrichment entity. Evaluation of the enrichment results side by side allows for the selection of a data enrichment entity.

18 Claims, 11 Drawing Sheets

| Name | Street | City | Postal code | Region | Country | Do Fixed | In bag |
|---|---|---|---|---|---|---|---|
| LIFF LEMS | 3430 N SOUTH 4TH PLACE | PHOENIX | 85044 | AZ | US | No analysys available | FALSE |
| O SUPPLY CO | 9920 OWENSMOUTH UNIT 3 | CHATSWORTH | 91311 | CA | US | Street Length Exceeds 25 | FALSE |
| COMBINED ALLOYS | P.O. BOX 74483 | CHICAGO | 60714 | IL | US | Non numeric Street Prefix | FALSE |
| COMMERCIAL CARTS | | | 00000 | | US | Street Length Exceeds 25 | FALSE |
| COMMISSIONER OF PATENTS | | | 00000 | | US | Street Length Exceeds 25 | FALSE |
| COMP USA | DEPT L-743 | COLUMBUS | 00000 | | US | Street Length Exceeds 25 | FALSE |
| COMPUSERVE INC | | | 43268-0742 | OH | US | Non numeric Street Prefix | FALSE |
| COMPUTATIONAL SYSTEM, INC. | | | 00000 | | US | Street Length Exceeds 25 | FALSE |
| COMPUTER PATENT ANNUITIES | P.O BOX 778 JERSEY | CHANNEL ISLANDS | JE1 1BL | | US | Non numeric Street Prefix | FALSE |
| COMPUTER RENAISSANCE | 8953 TAMPA | TARZANA | 91356 | CA | US | No analysys available | FALSE |
| CONCEPTS ETI | 4 BILLINGS ROAD | WHITE WATER JCT | 05001 | VT | US | No analysys available | FALSE |
| CONCORD TRANSPORTATION INC. | 590 CREDITSTONE ROAD | CONCORD | L4K 3Z3 | AB | US | Space in Postal Code | FALSE |
| CONFEDERATION OF INDIAN IND. | | | 00000 | | US | Street Length Exceeds 25 | FALSE |
| CONSOLIDATED FREIGHT | | | 00000 | | US | Street Length Exceeds 25 | FALSE |
| CONTRACTOR'S WAREHOUSE | | | 00000 | | US | Street Length Exceeds 25 | FALSE |
| COR-O-VAN MOVING AND STORAGE | DEPT 86442 | EL MONTE | 91735-6442 | CA | US | Non numeric Street Prefix | FALSE |
| COUNTY HEATING & AIR CONDITION | 1946 W COLLINS | ORANGE | 90667 | CA | US | No analysys available | FALSE |
| CPA COMPUTER PATENT ANNUITIES | | | 00000 | | US | Street Length Exceeds 25 | FALSE |
| CPI PHOTO FINISH | P.O. BOX 88997 | ST. LOUIS | 00000 | MO | US | Non numeric Street Prefix | FALSE |
| CREATIVE BALLOONS | | | 00000 | | US | Street Length Exceeds 25 | FALSE |

| | Source System ID | Name | Street | City | Postal code | Region | Coun... | DQ Bucket | My Data |
|---|---|---|---|---|---|---|---|---|---|
| ☐ | 370 | OMBNED ALLO' | P.O. BOX 74483 | CHICAGO | 60714 | IL | US | Non numeric Street Prefix | FA |
| ☐ | 380 | OMPUSERVE INC | DEPT L 742 | COLUMBUS | 43268-0742 | OH | US | Non numeric Street Prefix | FA |
| ☐ | 383 | OMPUTER PATEI | P.O BOX 776 JERSEY | CHANNEL ISLANDS | JE1 1BL | | US | Non numeric Street Prefix | FA |
| ☐ | 400 | OR-O-VAN MOVE | DEPT 66442 | EL MONTE | 91735-6442 | CA | US | Non numeric Street Prefix | FA |
| ☐ | 404 | P PHOTO FINISH | P.O. BOX 66997 | ST. LOUIS | 00000 | MO | US | Non numeric Street Prefix | FA |

DATA QUALITY ENRICHMENT INTEGRATION AND EVALUATION SYSTEM

This application claims benefit of U.S. Provisional Patent Application Ser. No. 60/896,868 filed Mar. 23, 2007 the specification of which is hereby incorporated herein by reference.

BACKGROUND OF THE INVENTION

1. Field of the Invention

Embodiments of the invention described herein pertain to the field of computer systems. More particularly, but not by way of limitation, one or more embodiments of the invention enable a data quality enrichment system for records in a database.

2. Description of the Related Art

There are currently no known systems that provide turnkey integration to data quality enrichment entities to allow a company to filter particular data quality problems and transmit the filtered data to particular data quality entities. In addition, there are no known solutions that allow for the turn-key evaluation of the performance of multiple data quality enrichment entities for a given data set. Data quality enrichment provides the capability for a company to correct, cleanse, and/or expand data in a database that has incorrect or missing information. If data entry is not controlled or if data is imported from a spreadsheet or external source that does not apply company specific validation rules during entry, then missing or incorrect information frequently occurs. There are also no known systems that allow for the geographic display of data to show the location that the valid and invalid records occur.

In order to solve the problem of incorrect or missing information upon import, companies generally outsource the data correction/enrichment efforts to external entities that analyze and provide suggested modifications for the data. External entities may include corporations that specialize in data quality enrichment for example. The entities generally charge based on the number of records that are sent to them for cleansing. There are no known solutions that allow for junk-records to be prefiltered (since no data quality enrichment entity can correct junk-records) before they are sent to an entity save from paying for unsolvable work. Likewise there are no known solutions that allow for customers to define filters to find particular data quality issues that may for example be handled in a discounted fashion by a particular data quality enrichment entity. For example, there are no known solutions that allow for the filtering of German address problems so that a particular vendor in Germany that is offering a discount can be sent only those records.

In order to communicate suspect records between a company and a data quality enrichment entity, integration of the company database with the data quality enrichment entity is required. Integration by and of itself generally requires custom programming to meet the interface requirements of a data quality enrichment entity. This effort may be implemented in a myriad of ways all of which require great levels of initial programming and ongoing support maintenance to keep the connection operative as schemas and interfaces change over time. This integration effort is generally not repeated to include multiple data enrichment entities due to the time and cost required. Hence, once a company chooses and integrates a desired database with a data quality enrichment entity, there is generally no further opportunity afforded to evaluate other data quality enrichment entities for cost/quality/speed or any other metric of performance. As many data quality enrichment entities claim to be the best, it is difficult for a customer with limited resources to verify the quality claims of more than one data quality enrichment entity.

Integration with data quality enrichment entities is a monumental task for many reasons. One reason that integration is difficult is that each data quality enrichment entity may have a completely different methodology for exchanging data records. For example, one data quality enrichment entity may utilize a web service while another may utilize a proprietary text based format. Even when two data quality enrichment entities both utilize the same type of communication interface, they may not utilize the same schema or XML tags for example for transferring data. Furthermore, there may be competing standards or schemas that are utilized in many cases for the transmittal of data and as the standards or schemas are augmented, integration interfaces may break. The cost and time for integrating to multiple data enrichment entities is so large that few if any companies attempt to integrate with more than one data enrichment entity. Since there are virtually no companies that integrate with multiple data enrichment entities, there are currently no known systems that allow for the comparison between of work product produced by different data enrichment entities.

There are many reasons why data in a database is not perfect. Data enrichment would not be needed at all if all data was perfectly entered into a database. Data entry that is not performed under control of validation rules for example is one reason. Another reason is that humans are involved in the data entry process and humans generally make mistakes. For example, when entering data into a data input screen a data entry employee may leave out a particular portion of an address or transpose two letters or numbers in an address for example. The cost of correcting data increases as more business processes rely on and utilize the incorrect data. For example, an address for shipment that leaves off a critical office number may be returned, requiring much time to track and fix. Importing imperfect data into a database is hence a costly endeavor that requires great amounts of time to enrich data to meet the quality requirements for a given company.

Data quality enrichment entities are not created equal. An address that one data quality enrichment entity believes is unintelligible may be corrected and enhanced correctly by another. Since data quality enrichment entities may improve quality over time and others may appear in the marketplace as time goes by, a company may save great amounts of money by periodically evaluating current and new data quality enrichment entities. Evaluation depends on integration, so if there are no real costs with integration, then evaluation may flourish. There are no known solutions that provide turnkey integration to data quality enrichment entities, and thus there are no known evaluation solutions that allow for rapidly evaluating multiple data quality enrichment entities. Furthermore, any evaluation of data that has been enriched is generally evaluated in a haphazard manner that does not allow for periodic apples versus apples comparisons to determine if an entity has improved over time or if two data enrichment quality entities have improved performance for example.

For at least the limitations described above there is a need for a data quality enrichment integration and evaluation system.

BRIEF SUMMARY OF THE INVENTION

One or more embodiments of the invention enable a data quality enrichment integration and evaluation system. Embodiments of the invention allow for the import of data into a database and the turnkey integration with data quality enrichment entities. The data imported into the database may be validated using validation rules that filter the data and assign the filtered data to one or more "buckets". Data with particular data quality problems may be sent to a particular bucket for processing by a particular data quality enrichment entity that specializes in fixing a particular data quality problem or is offering a discount to fix a type of data quality problem for example. A "junk-record" bucket may be utilized to send data records that are unintelligible to any data quality enrichment entity, so that these records are not transmitted to any data quality enrichment entity (and hence not paid for since each record transmitted incurs a cost regardless of whether it is salvageable). In one or more embodiments, non-validating data may be sent to be enriched by two or more data enrichment entities. The enrichment results may be compared between entities to enable the selection of a data enrichment entity. The enrichment results may also be drilled down into to provide geographic and other plots that show the quality of original data and quality of data enrichment provided by each data enrichment entity. Evaluation of the enrichment results side by side allows for the selection of a data enrichment entity. The selection of a data enrichment entity thus becomes a rapid task that saves tremendous effort in the process of selecting a data quality enrichment entity.

One or more embodiments form a computer program product for data quality enrichment integration and evaluation. The computer program product includes a computer usable memory medium having computer readable program code. The code is configured to couple with at least two data quality enrichment entities through respective enrichment connectors. The connectors adhere to an interface that allows any connector to rapidly integrate without software modification and to be immediate utilized. Once integrated, a new data quality enrichment entity may be utilized and evaluated for possible use on at least one record type or validation type for example. The record type may be non-validating in one or more ways. One or more embodiments allow for specialization of data quality enrichment entities to handle specific types of non-validating data for example. The computer program product transmits at least one data record to a data quality enrichment entity and transmits some common data records to a second data quality enrichment entity. The data records in common that are transmitted are the data records that are generally used for a side by side comparison of the two data quality enrichment entities. The computer program code obtains a result from the first data quality enrichment entity and another result from the second data quality enrichment entity. The computer program code compares the first result and the second result to yield a comparison. The comparison is then presented, for example on a graphical user interface.

In one or more embodiments, the validation of at least one data record occurs before transfer of at least one non-validating record to two or more data quality enrichment entities. In other embodiments this need not be the case. In other embodiments, multiple transfers of different non-validating data records to groups of data quality enrichment entities that handle particular validation problems may happen in parallel. In one or more embodiments the validating and non-validating data records may be presented on a geographic map. The validating and non-validating records for example may be sent to a third party mapping solution or a mapping solution may be part of the computer program code itself for example. In one or more embodiments the validating and non-validating records may be formatted into XML and transmitted to a third party mapping solution. The results of the mapping solution may be viewed graphically in any type of geographic map including national, regional or local for example with any type of boundary provided for reference on the geographic map.

The computer program product may utilize any enrichment connector that conforms to an enrichment connector interface. As long as the enrichment connector conforms to the interface it may be utilized and decoupled when no longer utilized without any modification to the computer program product. By coupling with two enrichment connectors associated with two data quality enrichment entities and transmitting at least one data record to each entity, it becomes the responsibility of each entity to enrich the data and provide a result.

In one or more embodiments the data records transmitted to the data quality enrichment entities is formatted into extensible markup language (XML). XML allows for human readable markup to provide boundaries in the form of tags that allow for computer programs to easily parse and interpret the information in a platform, language and operating system independent manner. In one or more embodiments, the data records may be transmitted via web services that likewise allow for platform, language and operating system independence, generally over firewalls. In the same manner, the results from the data quality enrichment entities may be obtained by the computer program product through a web service.

When comparing the results from the individual data quality enrichment entities the computer program product may yield a differences list for further study. The differences list may list the fields in common for each enriched record and the fields that differ for each field for each record for example. Metrics that define the effectiveness of each data quality in comparison to the original data records or to the other data quality enrichment entities allow the entities to be ranked for example. Purposeful introduction of errors and omissions in the data allows for absolute comparison of differences in the difference list. Otherwise, other embodiments may utilize any type of method for verifying which records from each data quality enrichment entity are actually correct, include contacting a particular organization associated with a record for human verification. In one or more embodiments, the honor system may be utilized with status codes from each data quality enrichment entity compared to see which status codes admit that a given record is not yet corrected or enhanced. For example, if two data quality enrichment entities return results for a given data record of "OK" and "NOT FIXED", then using the presumed correctness of each status code as provided externally by each entity, the computer program product assigns a positive value associated with the first entity and a non-positive value to the second entity. The sum of the status codes divided by the number of records is an example of the percentage of records that have actually been enhanced. Any other metric based on status codes is in keeping with the spirit of the invention.

The result from each entity may be presented on any type of graphical user interface component. For example, the results may be compared on a geographic map showing all non-validating records that have been successfully enhanced for example. In another embodiment, a pie-chart may be utilized to display the percentage of records that have been enhanced versus the number of data records that have failed enhancement.

BRIEF DESCRIPTION OF THE DRAWINGS

The above and other aspects, features and advantages of the invention will be more apparent from the following more particular description thereof, presented in conjunction with the following drawings wherein:

FIG. 2 shows a group of imported records.

FIG. 3 shows a graphical user interface component allowing for the selection of data quality enrichment entity in which to transmit data to.

FIG. 4 shows a selected record, the validation code, the modified (cleansed) data record according to the first data quality enrichment entity and the data quality enrichment entity status.

FIG. 7 shows a list of records with associated validation identifiers.

FIG. 9 shows a list of data records that are non-valid with respect to the "non-numeric street prefix" validation.

FIG. 10 shows the selection of a second data quality enrichment entity to send a group of data records to.

FIG. 11 shows a highlighted record that has been sent to two data quality enrichment entities while the lower right portion of the figure shows the status codes and resulting cleansed records returned by each data quality enrichment entity.

DETAILED DESCRIPTION

A data quality enrichment integration and evaluation system will now be described. In the following exemplary description numerous specific details are set forth in order to provide a more thorough understanding of embodiments of the invention. It will be apparent, however, to an artisan of ordinary skill that the present invention may be practiced without incorporating all aspects of the specific details described herein. In other instances, specific features, quantities, or measurements well known to those of ordinary skill in the art have not been described in detail so as not to obscure the invention. Readers should note that although examples of the invention are set forth herein, the claims, and the full scope of any equivalents, are what define the metes and bounds of the invention.

Figure 1:
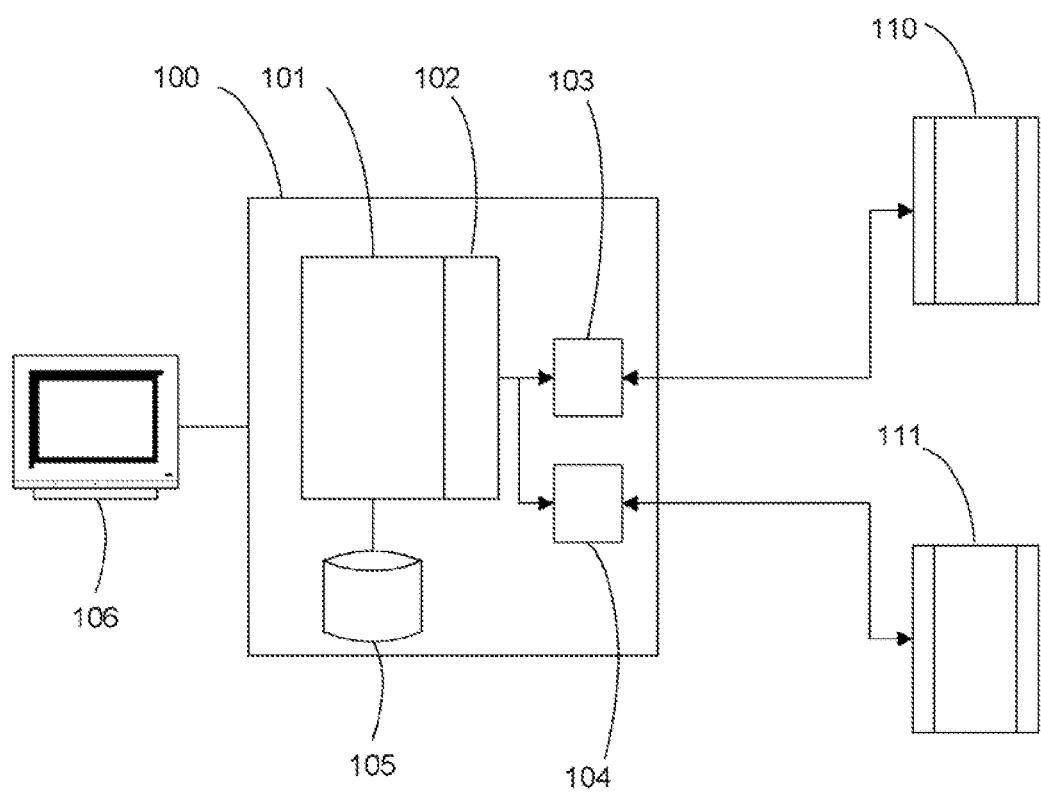
FIG. 1 is an architectural diagram of the system.

FIG. 1 is an architectural diagram of data quality enrichment integration and evaluation system 100. In one or more embodiments system 101 may include a computer server executing computer readable program code 101. Enrichment interface 102 couples enrichment connectors 103 and 104 to computer readable program code 101. Enrichment connectors 103 and 104 provide data communications connectors for data quality enrichment entities 110 and 111. Embodiments of the invention allow for the import of data into database 105 that couples with computer readable program code 101. In addition, the system provides turnkey integration with data quality enrichment entities 110 and 111. The data imported into database 105 may be validated using validation rules. The data imported into the database may be validated using validation rules that filter the data and assign the filtered data to one or more "buckets" within database 105. The bucket designation may associated an identifier or code with each record in database 105 for example. Use of an additional field with each record to hold the bucket code is but one way to associate a record with a bucket and any other method of associating a particular record with a particular data quality issue to a bucket is in keeping with the spirit of the invention.

Data with particular data quality problems may be sent to a particular bucket for processing by a particular data quality enrichment entity that specializes in fixing a particular data quality problem or is offering a discount to fix a type of data quality problem for example. A "junk-record" bucket designator may be associated with records within database 105 to avoid sending data records that are unintelligible to any data quality enrichment entity, so that these enriching these records is not paid for since each record transmitted incurs a cost regardless of whether it is salvageable. In one or more embodiments, non-validating data may be sent to be enriched by two or more data enrichment entities via enrichment connectors 103 and 104 for example. The enrichment results may be compared between entities to enable the selection of a data enrichment entity through presentation of the results on display 106. The enrichment results may also be drilled down into to provide geographic and other plots that show the quality of original data and quality of data enrichment provided by each data enrichment entity. Evaluation of the enrichment results side by side allows for the selection of a data enrichment entity. The selection of a data enrichment entity thus becomes a rapid task that saves tremendous effort in the process of selecting a data quality enrichment entity. Data quality enrichment integration and evaluation system 100 includes a computer usable memory medium in which computer readable program code 101 resides. The code is configured to couple with at least two data quality enrichment entities 110 and 111 for example through respective enrichment connectors 103 and 104. The connectors adhere to an interface 102. Interface 102 allows any connector to rapidly integrate without software modification and to be immediate utilized. Since no software modification is required, integration is immediate. Once integrated, a new data quality enrichment entity may be utilized and evaluated for possible use on at least one record type or validation type for example. The computer program product may utilize any enrichment connector that conforms to an enrichment connector interface. As long as the enrichment connector conforms to the interface it may be utilized and decoupled when no longer utilized without any modification to the computer program product. By coupling with two enrichment connectors associated with two data quality enrichment entities and transmitting at least one data record to each entity, it becomes the responsibility of each entity to enrich the data and provide a result. In one or more embodiments the data records transmitted to the data quality enrichment entities is formatted into extensible markup language (XML). XML allows for human readable markup to provide boundaries in the form of tags that allow for computer programs to easily parse and interpret the information in a platform, language and operating system independent manner. In one or more embodiments, the data records may be transmitted via web services that likewise allow for platform, language and operating system independence, generally over firewalls. In the same manner, the results from the data quality enrichment entities may be obtained by the computer program product through a web service.

In one or more embodiments, the validation of at least one data record occurs before transfer of at least one non-validating record to two or more data quality enrichment entities. In other embodiments this need not be the case, for example the entire contents of the imported data may be transferred to a particular data quality enrichment entity. In other embodiments, multiple transfers of different non-validating data records to groups of data quality enrichment entities that handle particular validation problems may happen in parallel. In one or more embodiments the validating and non-validating data records may be presented on a geographic map. The validating and non-validating records for example may be sent to a third party mapping solution or a mapping solution may be part of the computer program code itself for example. In one or more embodiments the validating and non-validating records may be formatted into XML and transmitted to a third party mapping solution. The results of the mapping solution may be viewed graphically in any type of geographic map including national, regional or local for example with any type of boundary provided for reference on the geographic map.

When comparing the results from the individual data quality enrichment entities the computer program product may yield a differences list for further study. The differences list may list the fields in common for each enriched record and the fields that differ for each field for each record for example. Metrics that define the effectiveness of each data quality in comparison to the original data records or to the other data quality enrichment entities allow the entities to be ranked for example. Purposeful introduction of errors and omissions in the data allows for absolute comparison of differences in the difference list. Otherwise, other embodiments may utilize any type of method for verifying which records from each data quality enrichment entity are actually correct, include contacting a particular organization associated with a record for human verification. In one or more embodiments, the honor system may be utilized with status codes from each data quality enrichment entity compared to see which status codes admit that a given record is not yet corrected or enhanced. For example, if two data quality enrichment entities return results for a given data record of "OK" and "NOT FIXED", then using the presumed correctness of each status code as provided externally by each entity, the computer program product assigns a positive value associated with the first entity and a non-positive value to the second entity. The sum of the status codes divided by the number of records is an example of the percentage of records that have actually been enhanced. Any other metric based on status codes is in keeping with the spirit of the invention.

The result from each entity may be presented on any type of graphical user interface component. For example, the results may be compared on a geographic map showing all non-validating records that have been successfully enhanced for example. In another embodiment, a pie-chart may be utilized to display the percentage of records that have been enhanced versus the number of data records that have failed enhancement.

Figure 2:
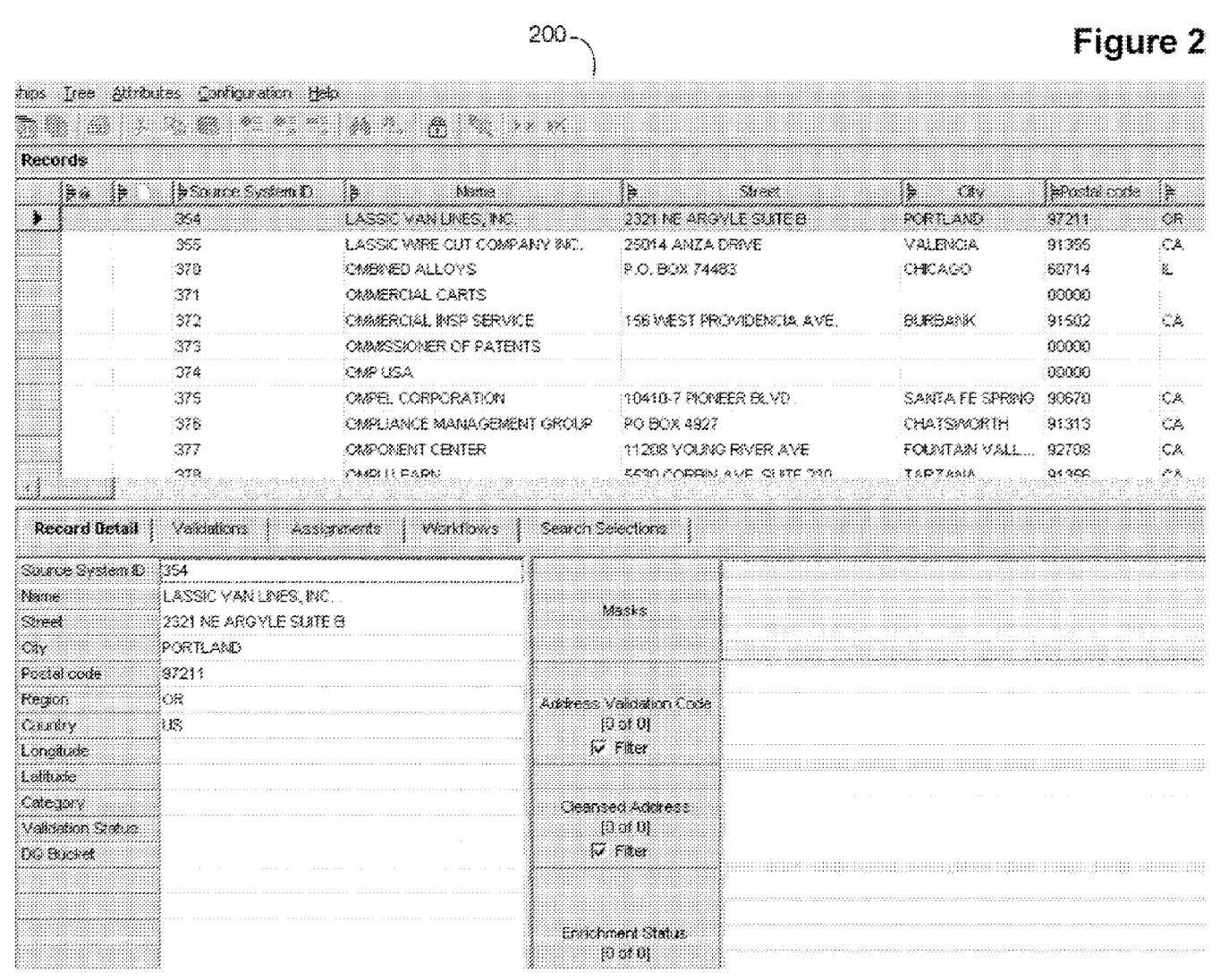

FIG. 2 shows a group of imported records in table 200. Computer readable program code 101 allows for the import of any type of data. In one or more embodiments, the data is in the form of a spreadsheet, in other embodiments, the data is in the form of a third party database. Any type of data holding component may be imported. Each imported record is shown in the topmost spreadsheet-like graphical user interface component. Each imported record (or record type having a specific group of fields) may be non-validating in one or more ways. For example record with "Source System ID" of 373 mid-way down upper graphical user interface component has no street address. Record 371 and 373 both have zip codes of "000000". One or more embodiments allow for specialization of data quality enrichment entities to handle specific types of non-validating data. For example, one data quality enrichment entity may specialize in enriching or cleansing phone numbers, while another may specialize in addresses.

Figure 3:
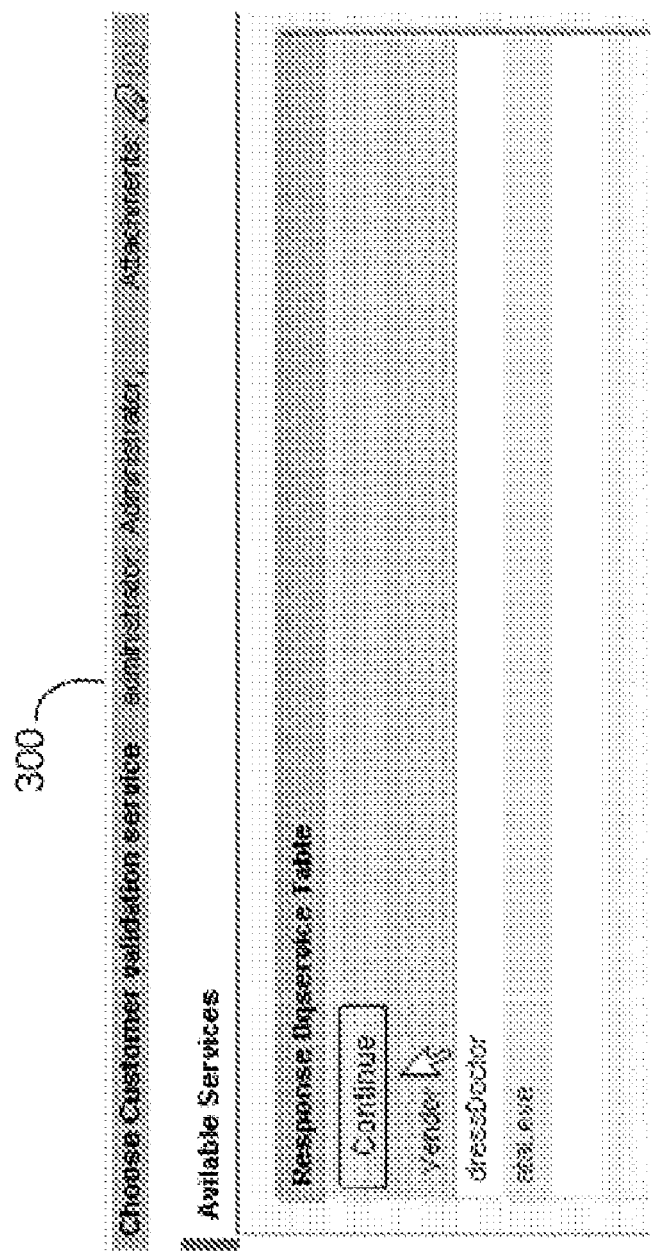

FIG. 3 shows data quality enrichment selector 300, here a graphical user interface component allowing for the selection of data quality enrichment entity in which to transmit data to. Any type of graphical user interface component may be utilized to select the first data quality enrichment entity in which to transmit data records to.

Figure 4:
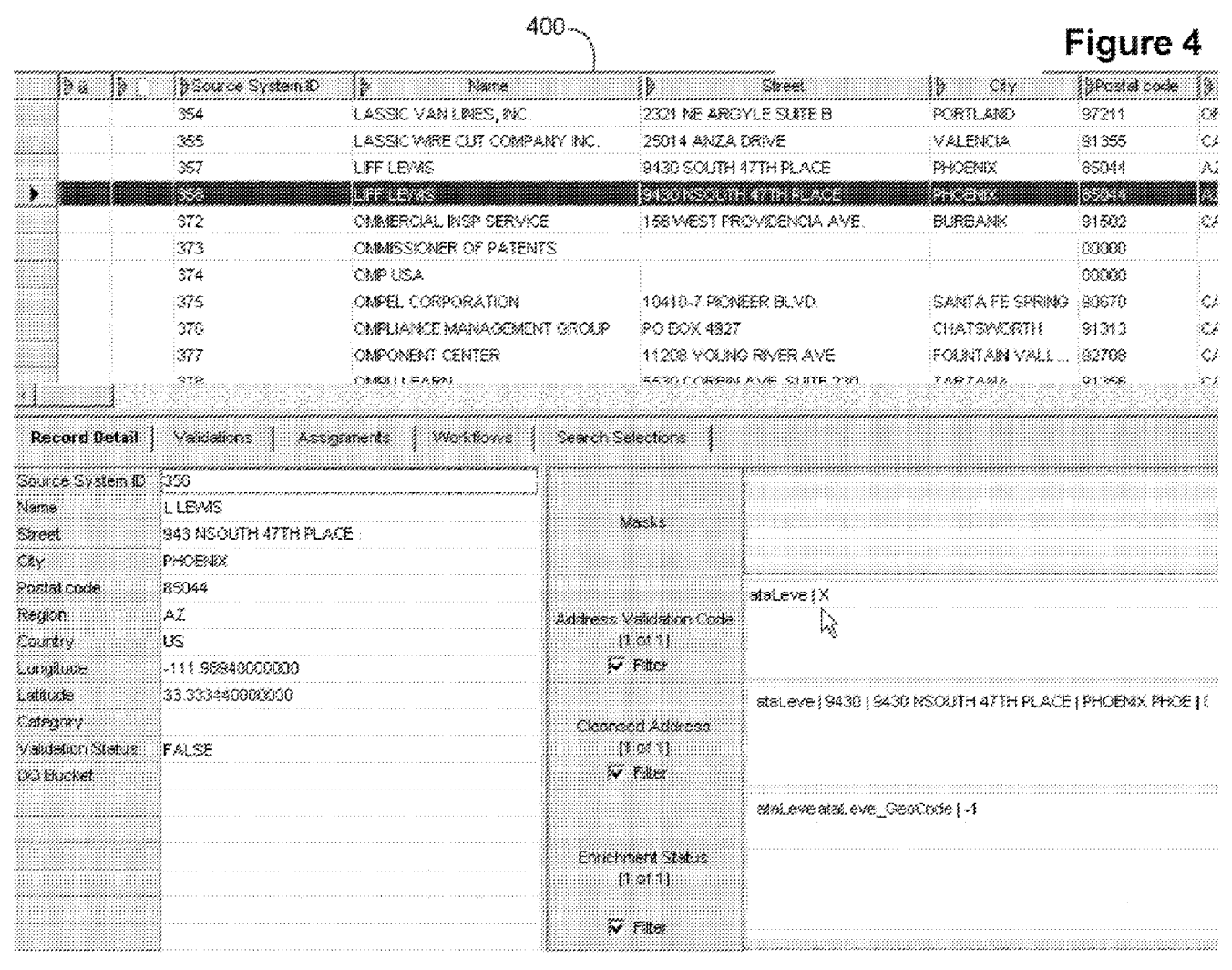

FIG. 4 shows a selected record, in table 400 i.e., record 356, the validation code in the lower right quadrant of the figure "Address Validation Code", the modified (cleansed) data record according to the first data quality enrichment entity, "Cleansed Address" and the data quality enrichment entity status, "Enrichment Status". In addition, on the left lower side of the figure, the data quality enrichment entity has provided the latitude and longitude. This allows for plotting the record on a geographic map for example.

Figure 5:
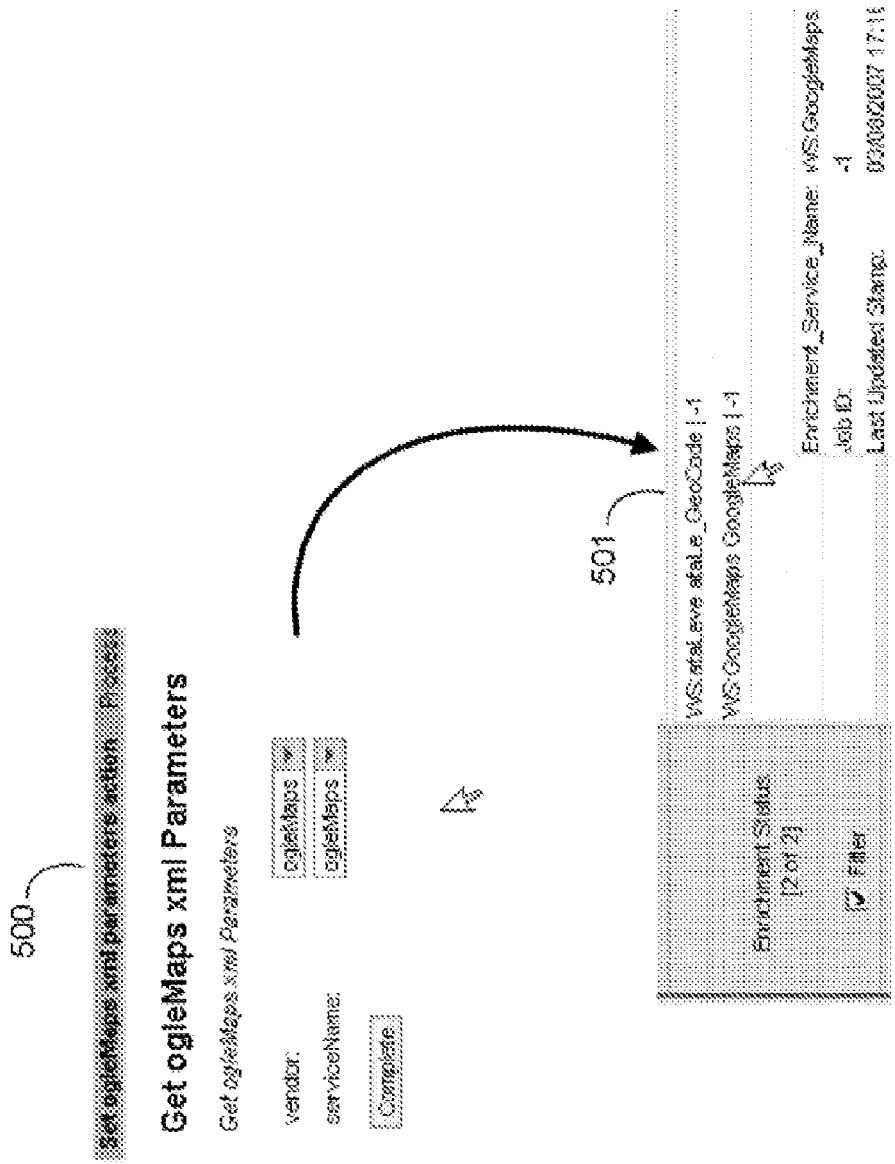
FIG. 5 shows the selection of a geographic service provider for obtaining a geographic map of the data records.

FIG. 5 shows the selection of a geographic service provider for obtaining a geographic map of the data records. By selecting a vendor and service name in geographic service selector 500, another enrichment of the data occurs as is shown in a cut-out of the lower right side of FIG. 4, here shown as enrichment status 501. In one or more embodiments, the data record is provided with latitude and longitude and in another embodiment, the latitude and longitude are enriched or cleansed. In either case, the updated status is shown as enrichment status 501.

Figure 6:
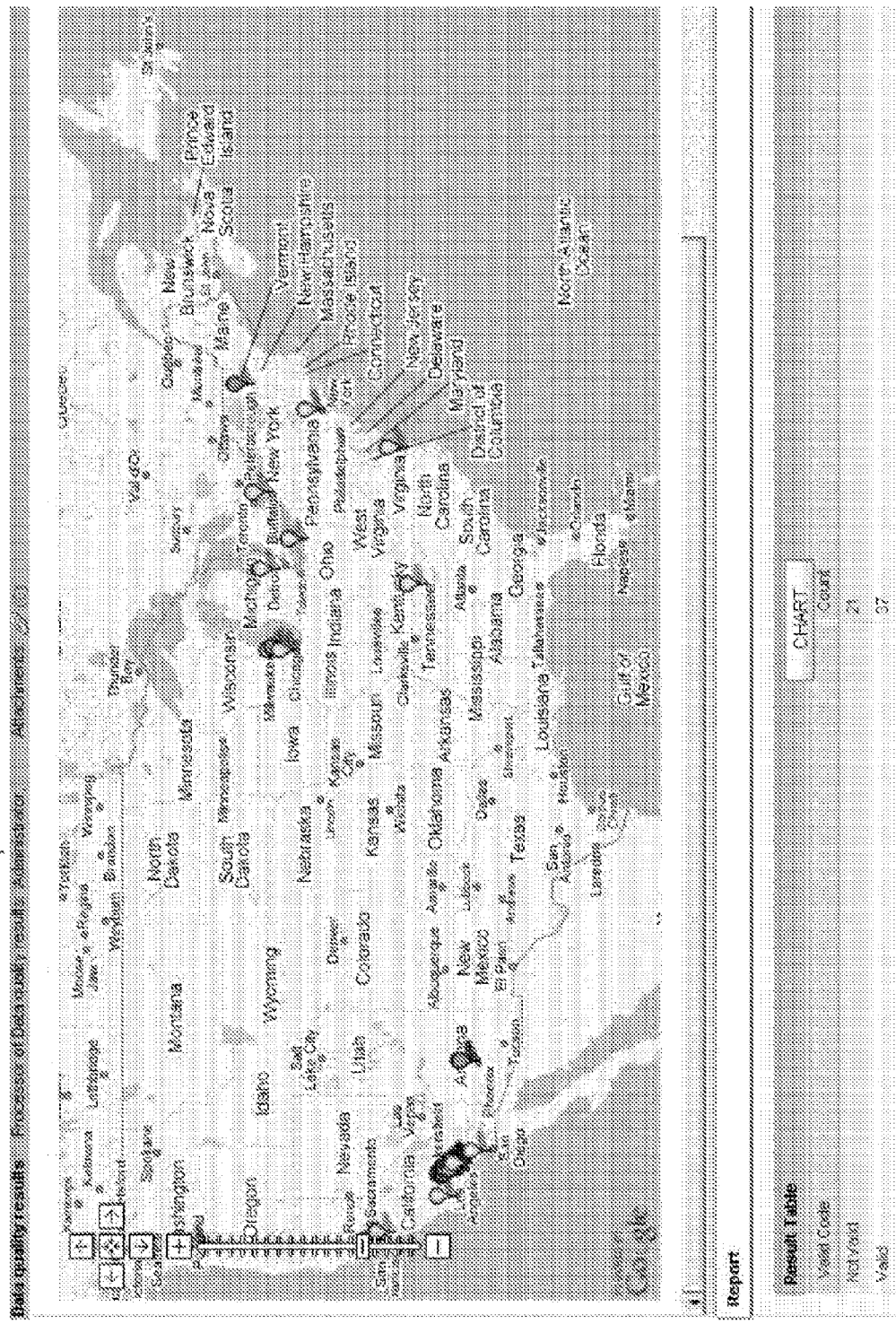
FIG. 6 shows a geographic map view of the valid and non-valid records.

FIG. 6 shows a geographic map 600 view of the valid and non-valid records. In this view, a data quality enrichment entity may be reviewed to see if the entity has problems with enriching data in any particular area for example. In other embodiments, the geographic map view is utilized to view data records for known validation problems before transmitting data to a data quality enrichment entity. In other embodiments, the geographic map view is utilized for both scenarios of before and after viewing. FIG. 6 map be implemented using GOOGLEMAPS® or any other mapping solution.

FIG. 7 shows a list of records 700 with associated validation identifiers. Executing a workflow that associates a validation identifier is one possible way in which to couple data records with a bucket that allows for transmitting the records to the appropriate data quality enrichment entity for processing. Alternatively, if a data record is so damaged that it is not salvageable by any data quality enrichment entity, then it may be assigned to the "junk bucket" to avoid transmission, enrichment and fees. Here the second to right column shows validation identifiers of "Street Length Exceeds 25" which is a database specific related validation. In addition, "Space in Postal Code" is a general error related validation. Any type of method of pre-screening data records into buckets or groups for transmittal and enrichment is in keeping with the spirit of the invention.

Figure 8:
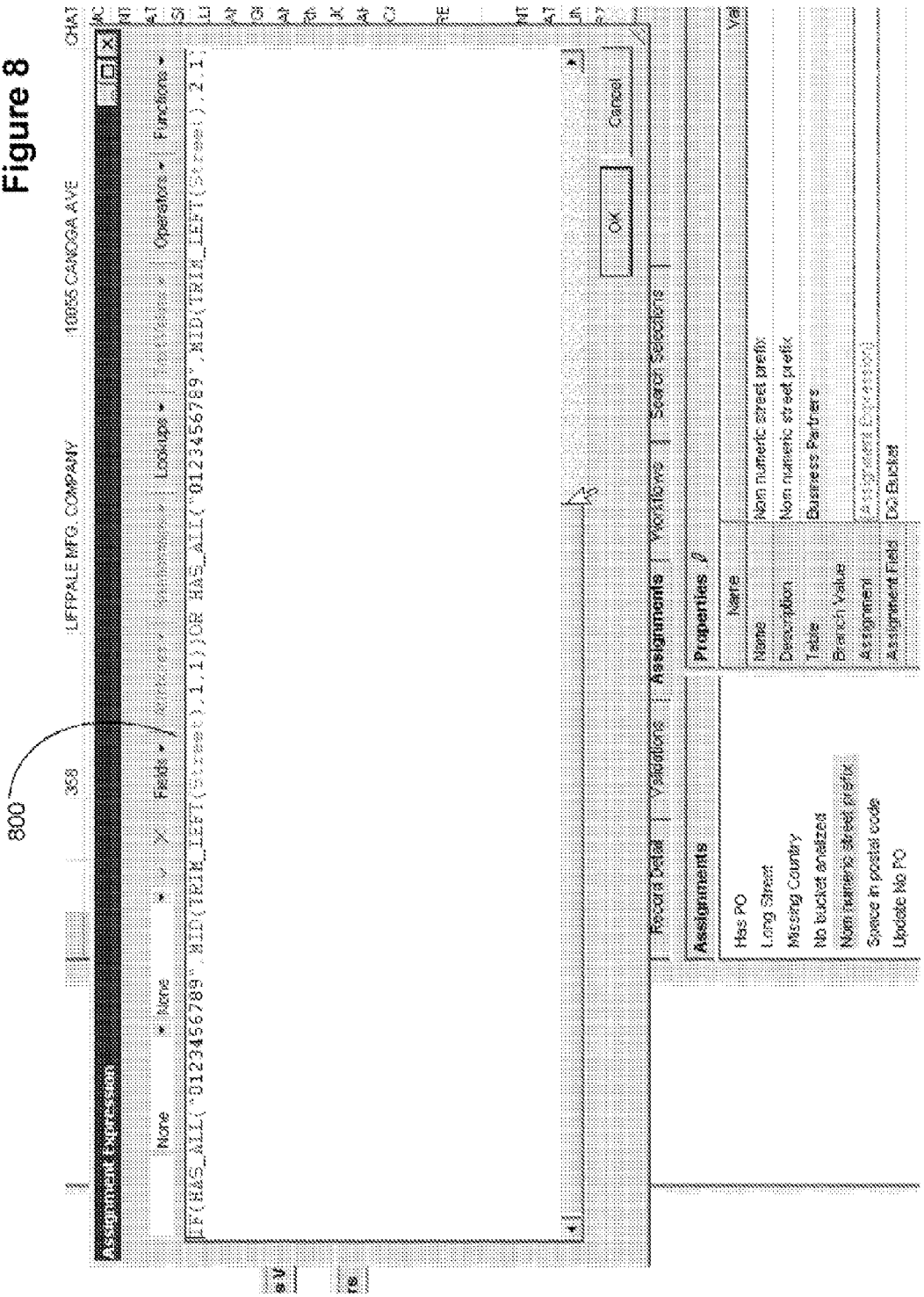
FIG. 8 shows a validation formula for "non-numeric street prefix".

FIG. 8 shows a validation formula for "non-numeric street prefix". Panel 800 shows the pattern that is searched to find a "non-numeric street prefix". Any type of script or programming language may be utilized to form a pattern matcher in one or more embodiments of the invention including general regular expression ECMAScript or any proprietary version thereof, or any other proprietary or standards based language. In one or more embodiments a script builder may be utilized to prevent syntax errors upon initial input of the script or during subsequent maintenance of the script.

FIG. 9 shows a list of data records that are non-valid with respect to the "non-numeric street prefix" validation. Non-validating list 900 shows that only 5 records out of the imported data records do not validate with respect to at least one validation. These records may be sent to a specific data quality enrichment entity that specializes in this type of data cleansing for example. Likewise, these data records may be sent to more than one data quality enrichment entity to allow for side by side comparison of the enrichment results.

Figure 10:
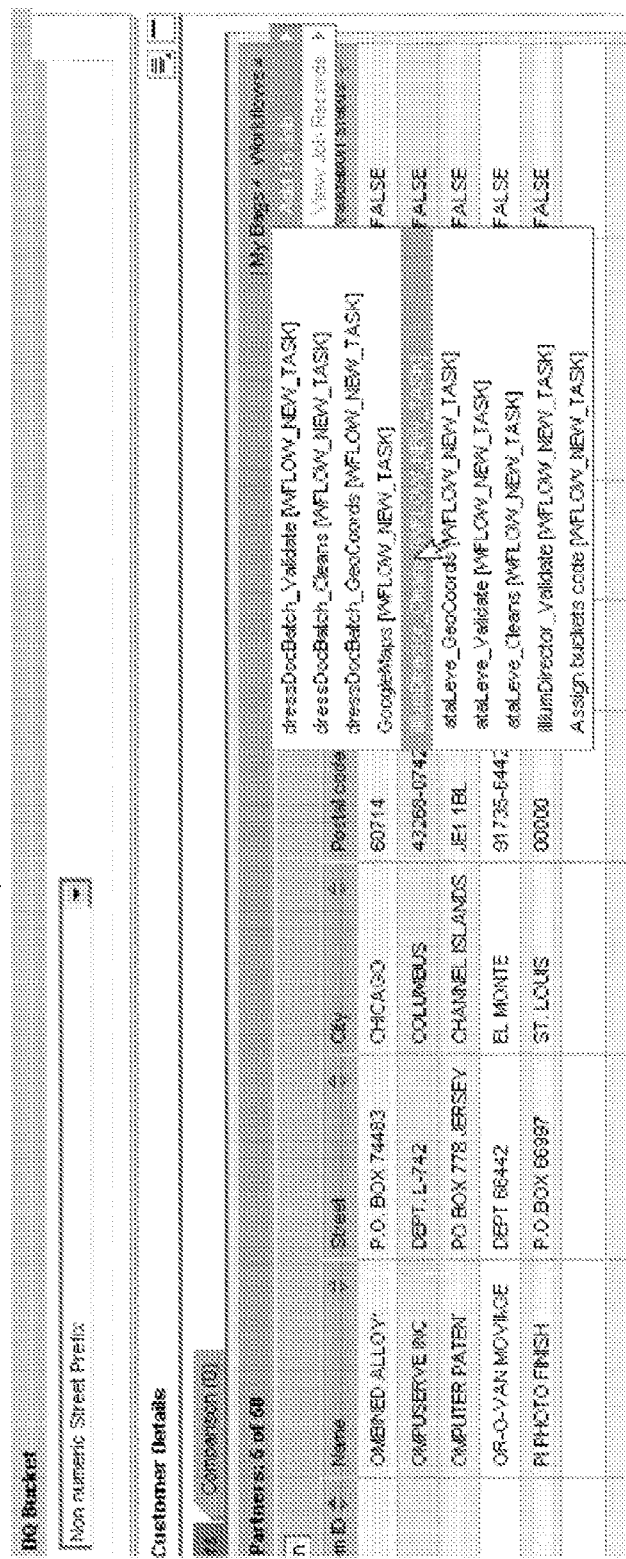

FIG. 10 shows the selection of a second data quality enrichment entity to send a group of data records to. In one scenario, the computer program product transmits at least one data record to a data quality enrichment entity and transmits some common data records to a second data quality enrichment entity. The data records in common that are transmitted are the data records that are generally used for a side by side comparison of the two data quality enrichment entities. The computer program code obtains a result from the first data quality enrichment entity and another result from the second data quality enrichment entity. The computer program code compares the first result and the second result to yield a comparison. The comparison is then presented, for example on a graphical user interface. In this figure, non-numeric street prefix non-validating records view 1000 also shows a pop-up menu on the right side of the screen that allows for the selection of another data quality enrichment entity, in this case the fifth one in the list.

Figure 11:
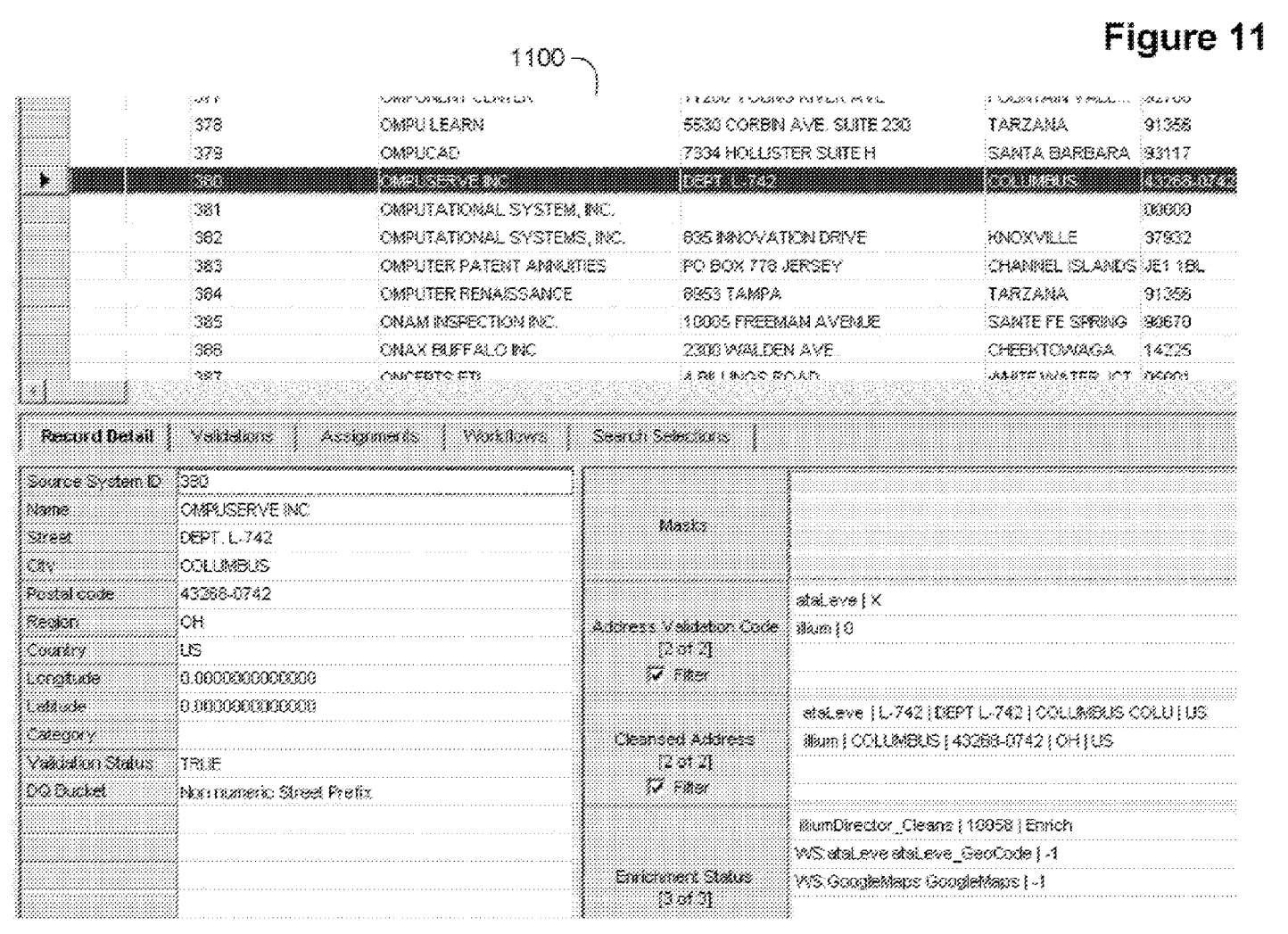

FIG. 11 shows a highlighted record that has been sent to two data quality enrichment entities while the lower right portion of the figure shows the status codes and resulting cleansed records returned by each data quality enrichment entity. Highlighted record window 1100 shows record 380 selected and the lower right portion of the window shows that the "Address Validation Codes" returned by the two data quality enrichment entities differs. In addition, the actual records that have been enriched are shown in the graphical user interface component immediately beneath the "Address Validation Code" element. The enriched data is notated as "Cleansed Address" and again, each data quality enrichment entity has returned data that differs. By evaluating the status codes returned, the system can provide a metric as to which data quality enrichment entity is more accurate for example. Likewise, measuring the quality of the enriched data records, either manually or via passing known data that has been altered to fail certain validations to the data quality enrichment entities, a metric of quality may be obtained.

While the invention herein disclosed has been described by means of specific embodiments and applications thereof, numerous modifications and variations could be made thereto by those skilled in the art without departing from the scope of the invention set forth in the claims.

What is claimed is:

1. A computer program product for data quality enrichment integration and evaluation comprising a computer usable memory medium having computer readable program code embodied therein wherein said computer readable program code is configured to:
   couple with a plurality of independent data quality enrichment entities through a plurality of enrichment connectors;
   transmit at least one data record to a first data quality enrichment entity selected from said plurality of data quality enrichment entities;
   transmit said at least one data record to a second data quality enrichment entity selected from said plurality of data quality enrichment entities;
   obtain a first enriched result from said first data quality enrichment entity, the first enriched result representing the at least one data record after a first data quality enrichment process is applied by the first data quality enrichment entity;
   obtain a second enriched result from said second data quality enrichment entity, the second enriched result representing the at least one data record after a second data quality enrichment process, different than the first data quality enrichment process, is applied by the second data quality enrichment entity;
   compare said first enriched result and said second enriched result to yield a comparison; and
   present said comparison of said first enriched result and said second enriched result, wherein said computer readable program code is further configured to format said at least one data record into XML.

2. The computer program product of claim 1 wherein said computer readable program code is further configured to validate said at least one data record, associate non-validating records with a bucket and transfer at least one non-validating record in said bucket to said data quality enrichment entities.

3. The computer program product of claim 1 wherein said computer readable program code is further configured to validate said at least one data record and prevent a transfer of at least one non-validating record to said data quality enrichment entities when said at least one non-validating record is associated with a junk bucket.

4. The computer program product of claim 1 wherein said computer readable program code is further configured to validate said at least one data record and present said at least one data record and said at least one non-validating record on a geographic map.

5. The computer program product of claim 1 wherein said computer readable program code is configured to transmit said at least one data record to said first data quality enrichment entity using a first enrichment connector selected from said enrichment connectors and wherein said computer readable program code is further configured to transmit said at least one data record to said second data quality enrichment entity using a second enrichment connector selected from said enrichment connectors.

6. The computer program product of claim 1 wherein said computer readable program code is configured to transmit said at least one data record via a web service.

7. The computer program product of claim 1 wherein said computer readable program code is configured to obtain said first enhanced result via a web service.

8. The computer program product of claim 1 wherein said computer readable program code is configured to compare said first enhanced result and said second enhanced result against said at least one data record to yield a differences list.

9. The computer program product of claim 1 wherein said computer readable program code is configured to compare said first enhanced result and said second enhanced result against a first status code and a second status code provided by said first data quality enrichment entity and said second data quality enrichment entity respectively.

10. The computer program product of claim 1 wherein said computer readable program code is configured to present said first enhanced result and said second enhanced result on at least one graphical user interface component.

11. A computer program product for data quality enrichment integration and evaluation comprising a computer usable memory medium having computer readable program code embodied therein wherein said computer readable program code is configured to:
   couple with a plurality of independent data quality enrichment entities through a plurality of enrichment connectors;
   validate at least one data record to yield at least one non-validating data record;
   associate said at least one non-validating data record with a bucket;

transmit said at least one non-validating data record in said bucket to a first data quality enrichment entity selected from said plurality of data quality enrichment entities;

transmit said at least one non-validating data record in said bucket to a second data quality enrichment entity selected from said plurality of data quality enrichment entities;

obtain a first enhanced result from said first data quality enrichment entity, the first enriched result representing the at least one non-validating data record after a first data quality enrichment process is applied by the first data quality enrichment entity;

obtain a second enhanced result from said second data quality enrichment entity, the second enriched result representing the at least one non-validating data record after a second data quality enrichment process, different than the first data quality enrichment process, is applied by the second data quality enrichment entity;

compare said first enhanced result and said second enhanced result to yield a comparison; and present said comparison of said first enhanced result and said second enhanced result, wherein said computer readable program code is further configured to format said at least one data record into XML.

12. The computer program product of claim 11 wherein said computer readable program code is further configured to present said at least one data record and said at least one non-validating record on a geographic map.

13. The computer program product of claim 11 wherein said computer readable program code is further configured to validate said at least one data record and prevent a transfer of at least one non-validating record to said data quality enrichment entities when said at least one non-validating record is associated with a junk bucket.

14. The computer program product of claim 11 wherein said computer readable program code is configured to transmit said at least one data record to said first data quality enrichment entity using a first enrichment connector selected from said enrichment connectors and wherein said computer readable program code is further configured to transmit said at least one data record to said second data quality enrichment entity using a second enrichment connector selected from said enrichment connectors.

15. The computer program product of claim 11 wherein said computer readable program code is configured to transmit said at least one data record via a web service and obtain said first enhanced result via a web service.

16. The computer program product of claim 11 wherein said computer readable program code is configured to compare said enhanced first result and said second enhanced result against said at least one data record to yield a differences list.

17. The computer program product of claim 11 wherein said computer readable program code is configured to compare said first enhanced result and said second enhanced result against a first status code and a second status code provided by said first data quality enrichment entity and said second data quality enrichment entity respectively.

18. The computer program product of claim 11 wherein said computer readable program code is configured to present said first enhanced result and said second enhanced result on at least one graphical user interface component.

* * * * *